United States Patent
Schofield

(10) Patent No.: US 8,234,345 B2
(45) Date of Patent: Jul. 31, 2012

(54) PRESERVING A MESSAGING SERVICE IN A HIGHLY AVAILABLE ENVIRONMENT

(75) Inventor: Andrew J. Schofield, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/627,668

(22) Filed: Nov. 30, 2009

(65) Prior Publication Data

US 2010/0268781 A1 Oct. 21, 2010

(30) Foreign Application Priority Data

Apr. 21, 2009 (EP) .................................... 09158309

(51) Int. Cl.
*G06F 15/16* (2006.01)
(52) U.S. Cl. ........................................ 709/206; 709/227
(58) Field of Classification Search .......... 709/201–207, 709/217–229; 719/312–317
See application file for complete search history.

(56) References Cited

U.S. PATENT DOCUMENTS

| 2002/0111929 | A1* | 8/2002 | Pudipeddi et al. | 707/1 |
| 2007/0016910 | A1* | 1/2007 | Roberts | 719/313 |
| 2008/0313349 | A1* | 12/2008 | Nickoll et al. | 709/239 |

OTHER PUBLICATIONS

Mark Hapner et al., "Java Message Service Specification", Apr. 12, 2002, Sun Microsystems, version 1.1, 4.4.3 Creating Temporary Destinations on p. 61, www.oracle.com/technetwork/java/docs-136352.html.*

"Configuring Advanced JMS System Resources", http://download-llnw.oracle.com/docs/cd/E15051_01/wls/docs103/jms_admin/advance_config.html (Obtained from the Internet on Jul. 22, 2010) 2008, 17 pages.

"Creating Robust JMS Applications", http://download.oracle.com/docs/cd/E17477_01/javaee/1.3/jms/tutorial/1_3_1-fcs/doc/advanced.html (Obtained from the internet on Jul. 20, 2010) 2002, 9 pages.

"International Application No. PCT/EP2010/054212 International Search Report", Aug. 31, 2010, 9 pages.

Girdley, Michael et al., "Enterprise Messaging with the Java Message Service (JMS)", http://www.informit.com/articles/article.aspx?p=26137 (Obtained from the Internet on Jul. 20, 2010) Mar. 29, 2002, 22 pages.

Pletat, Udo, "High Availability in a J2EE Enterprise Application Environment", http://citeseerx.ist.psu.edu/viewdoc/download-?doi=10.1.1.95.372&rep=re p1&type=pdf (Obtained from the Internet on Jul. 20, 2010) 2008, 8 pages.

Thribhuvan, Thakur, "Designing Messaging Applications with Temporary Queues", http://onjava.com/pub/a/onjava/2007/04/10/designing-messaging-applications-withtemporary-queues.html (Obtained from the Internet on Jul. 20, 2010) Apr. 20, 2007, 6 pages.

* cited by examiner

*Primary Examiner* — Wing Chan
*Assistant Examiner* — Ruolei Zong
(74) *Attorney, Agent, or Firm* — DeLizio Gilliam, PLLC

(57) ABSTRACT

A system receives an identifier for a temporary destination in response to messaging software at a client requesting that a messaging server create the temporary destination. The messaging software uses the identifier to indicate the temporary destination as a destination for responses to messages from the messaging software. The identifier is logged. A disconnection from the messaging server is detected. A second request for a temporary destination is created. The identifier is indicated in the second request. The second request indicating the identifier is transmitted to the messaging server to preserve a messaging service in a highly available environment.

16 Claims, 3 Drawing Sheets

PRESERVING A MESSAGING SERVICE IN A HIGHLY AVAILABLE ENVIRONMENT

RELATED MATTER

This application claims priority to European Patent Application Number 09158309.6 filed Apr. 21, 2009, which is incorporated by reference in its entirety.

BACKGROUND

In a highly available environment, it is beneficial for an entity (e.g. a computer system; a computer program, etc.) to continue to run without awareness of any short-term outages in the environment. For example, if a messaging server fails due to a hardware problem and the messaging server is subsequently configured to restart on another computer, any associated client program can be seamlessly reconnected to the messaging server in the messaging server's new location by messaging software associated with the client program. When such a reconnection occurs, problems can arise in providing an environment wherein the entity (e.g. the client program) can continue to run seamlessly.

SUMMARY

Embodiments include a method that receives an identifier for a temporary destination in response to messaging software at a client requesting that a messaging server create the temporary destination. The messaging software uses the identifier to indicate the temporary destination as a destination for responses to messages from the messaging software. The identifier is logged. A disconnection from the messaging server is detected. A second request for a temporary destination is created. The identifier is indicated in the second request. The second request indicating the identifier is transmitted to the messaging server to preserve a messaging service in a highly available environment.

Embodiments include a computer program product for preserving a messaging service in a highly available environment. The computer program product comprises a computer usable medium having computer usable program code embodied therewith. The computer usable program code is configured to determine that messaging software at a client was disconnected from a messaging server that supports the messaging service. The computer usable program code is configured to receive a request from the messaging software for a temporary destination, wherein the request indicates a temporary location identifier. The computer usable program code is configured to determine if a temporary location identified by the temporary location identifier has been destroyed. If the temporary location has been destroyed, the computer usable program code is configured to create a new temporary location, assign the temporary location identifier to the new temporary location, and associate the client as owner of the new temporary location. If the temporary location has not been destroyed, the computer usable program code is configured to re-associate the client as owner of the temporary location.

Embodiments include a computer program product for preserving a messaging service in a highly available environment. The computer program product comprises a computer usable medium having computer usable program code embodied therewith. The computer usable program code is configured to receive an identifier for a temporary destination in response to messaging software at a client requesting that a messaging server create the temporary destination. The messaging software uses the identifier to indicate the temporary destination as a destination for responses to messages from the messaging software. The computer usable program code is configured to log the identifier. The computer usable program code is configured to detect disconnection from the messaging server. The computer usable program code is configured to create a second request for a temporary destination. The computer usable program code is configured to indicate the identifier in the second request, and transmit the second request indicating the identifier to the messaging server.

Embodiments include an apparatus that comprises a processor, a network interface, and a messaging server. The messaging server is operable to determine that a messaging software at a client was disconnected from the messaging server that supports a messaging service. The messaging server is operable to receive a request from the messaging software for a temporary destination, wherein the request indicates a temporary location identifier, and determine if a temporary location identified by the temporary location identifier has been destroyed. If the temporary location has been destroyed, the messaging server is operable to create a new temporary location, assign the temporary location identifier to the new temporary location, and associate the client as owner of the new temporary location. If the temporary location has not been destroyed, the messaging server is operable to re-associate the client as owner of the temporary location.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

It should be understood that the terms "server" and "client" herein are for exemplary purposes only.

Figure 1:
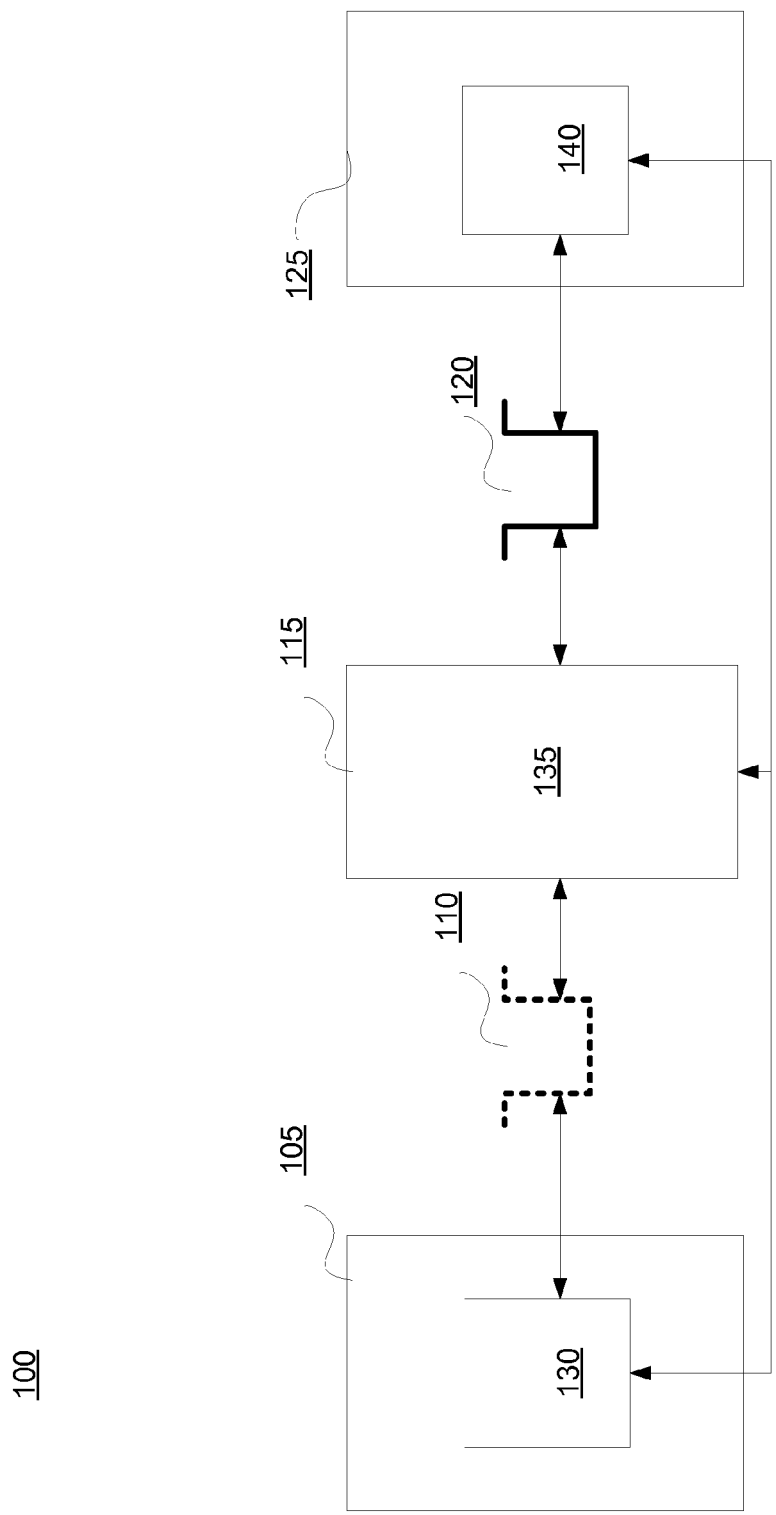
FIG. 1 is a block diagram of a system associated with a highly available environment in which temporary destinations are used.

With reference to the system (100) of FIG. 1, in the field of commercial messaging, it is common for a client program (105) wishing to exchange messages with a server program (125) in a request-reply pattern to generate a request for a temporary destination (110) (e.g. a queue).

A temporary destination is advantageous as it is created dynamically on request by a client program and thus it does not need to be created in a pre-processing step. Furthermore, a temporary destination is associated with the "life" of a client program such that there is no need for administrative procedures (e.g. deletion of temporary destinations) once a client has ended. The destination is temporary in that it can be automatically destroyed e.g. when the client program disconnects from the messaging server or when the messaging server stops.

Typically, client messaging software (130) associated with the client program (105) wishing to use request-reply messaging creates a request to generate a temporary destination.

In an example, the client messaging software (130) connects to a messaging server (115) and sends the request to the messaging server (115). In response to receiving the request, the messaging server (115) generates a temporary destination (110) and assigns an identifier to the destination (110) during the generation of the destination (110).

The client messaging software (130) determines the temporary destination's (110) identifier and can "advertise" the identifier as the location to which it wishes reply messages to be sent.

The client program (105) is identified as the "owner" of the destination (110) so that the client program (105) can have certain rights associated with the destination (110) e.g. the ability to destroy the destination (110) explicitly or implicitly when the client program (105) disconnects from the messaging server (115).

In an example, when the client messaging software (130) sends a request message it includes the identifier of the temporary destination (110) as a "reply-to" destination in the request message. The request message is sent using the messaging server (115) to a destination (120) associated with server messaging software (140) associated with the server program (125). Reply messages from the server messaging software (140) are sent using the messaging server (115) to the temporary destination (110) identified by the "reply-to" destination.

In a highly available environment, it is beneficial for the client program (105) to continue running without awareness of any short-term outages of e.g. the messaging server (115). For example, if the messaging server (115) fails but has been configured to restart on another computer, the client program (105) can be seamlessly reconnected to the messaging server (115) in the messaging server's (115) new location by the client messaging software (130).

However, because there was a period when the client program (105) was not connected to the messaging server (115) e.g. because of failure of the messaging server (115), the client program's (105) temporary destination (110) will typically have been destroyed. It should be understood that if the connection breaks due to e.g. a network error, the temporary destination (110) will typically not be destroyed because the messaging server will not have stopped.

If a new temporary destination is created as part of the reconnection process, the new temporary destination will have a new identifier. The new identifier does not match the identifier that was used by the client messaging software (130) prior to disconnection.

Because the client program (105) is unaware of the reconnection, the client messaging software (130) will continue to advertise the original identifier of the original temporary destination (110) as a "reply-to" destination instead of a new identifier for a new temporary destination. However, as the original temporary destination (110) no longer exists, the client messaging software (130) may not receive reply messages subsequent to a reconnection.

The client messaging software (130) could be configured to request the identifier of the temporary destination repeatedly to ensure that the client messaging software (130) becomes aware of any changes. However, this would be unnecessary in an environment which was not highly available as a client program in such an environment is not disconnected and subsequently reconnected. Furthermore, in an environment which is highly available, a client program would have to be reconfigured (e.g. code associated with the client program has to be modified) which could be costly and complex.

Figure 2:
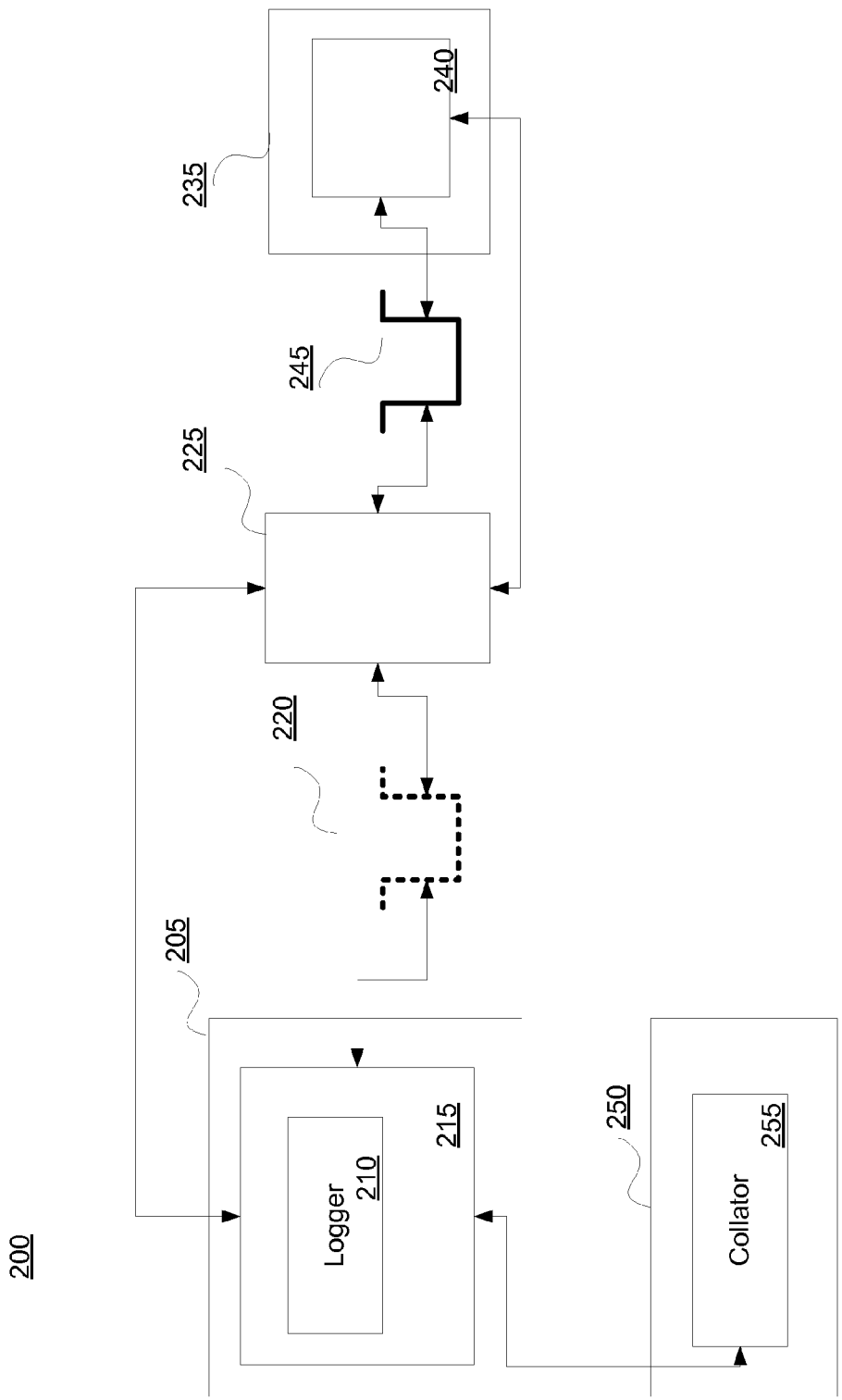
FIG. 2 depicts an example highly available system that preserves a messaging service.

FIG. 2 depicts an example highly available system that preserves a messaging service. A system (200) comprises a client program (205) operable to exchange messages with a server program (235) in a request-reply pattern. The client program (205) comprises client messaging software (215) having a logger (210).

Figure 3:
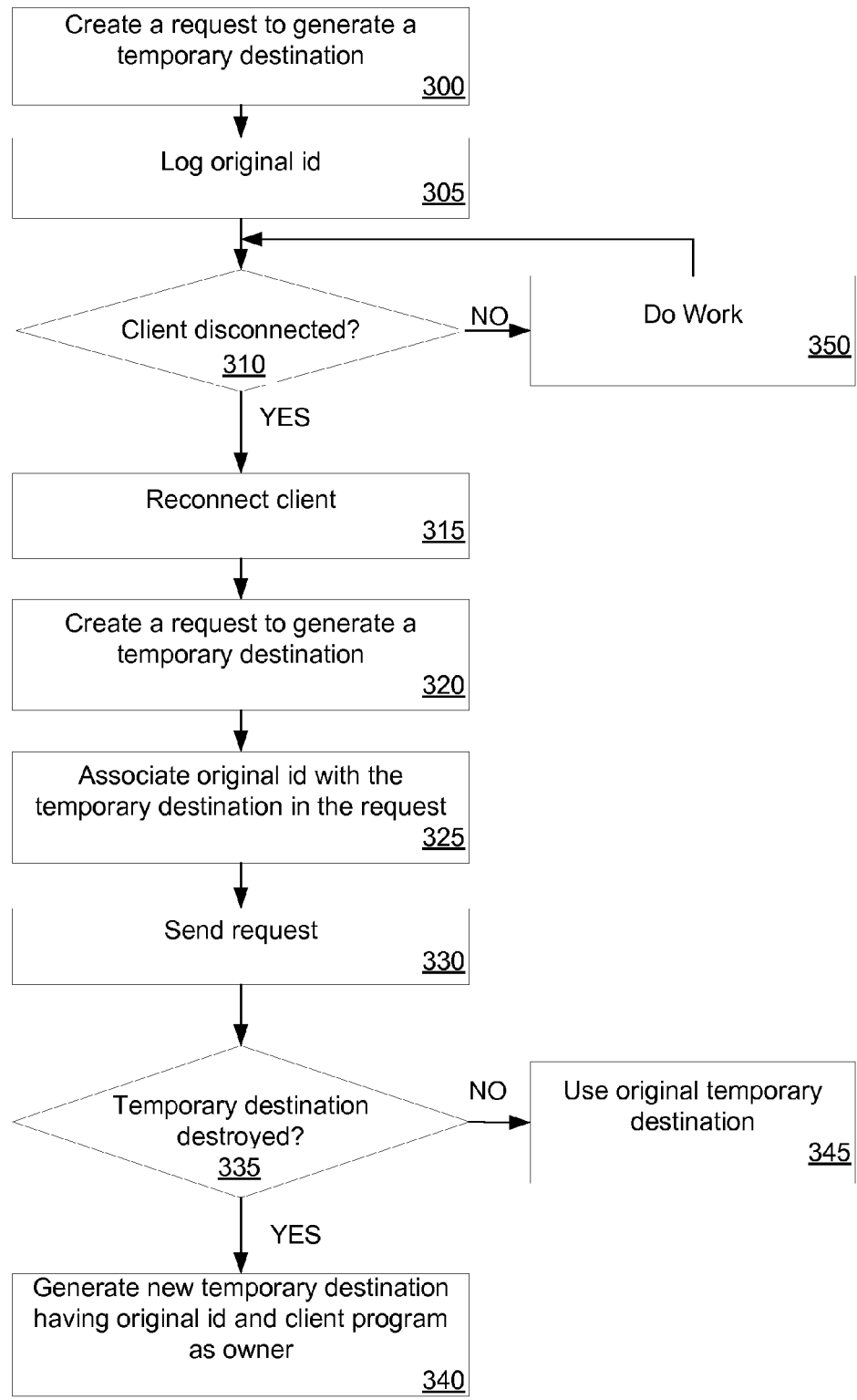
FIG. 3 depicts a flowchart of example operations for preserving a messaging service with a persistent identifier for a temporary destination.

In a pre-processing step, the client messaging software (215) connects to a messaging server (225). With reference to FIG. 3, the client messaging software (215) creates (300) and sends a request to generate a temporary destination to the messaging server (225).

In response to receiving the request, the messaging server (225) generates a temporary destination (termed herein an original temporary destination) (220).

The messaging server (225) assigns an identifier (termed herein an original identifier) to the original temporary destination (220) and provides the original identifier to the client messaging software (215).

The messaging server (225) also associates the client program (205) as the "owner" of the original temporary destination so that the client program (205) can have certain rights associated with the destination (220).

The temporary destination (220) is temporary in that it is automatically destroyed e.g. when the client program (205) disconnects from the messaging server (225) or when the messaging server (225) stops.

In an example, when the client messaging software (215) sends a request message it includes the original identifier as a "reply-to" destination in the request message. Reply messages are sent by the server messaging software (240) using the messaging server (225) to the original destination (220) identified by the original identifier.

FIG. 3 depicts a flowchart of example operations for preserving a messaging service with a persistent identifier for a temporary destination. At 310, if the client program (205) has not been disconnected, the client program (205) continues to do work (step 350). The process can further check (e.g. at regular intervals) whether the client has been disconnected.

If the client program (205) has been disconnected, the client program (205) receives a notification informing the client program (205) of the disconnection.

In response to the notification, the client messaging software (215) attempts to reconnect (315) the client program (205) to the messaging server (225).

In response to the client messaging software (215) reconnecting the client program (205) (typically without intervention by or knowledge of the client program (205)) to the messaging server (225), the client messaging software (215) creates (320) a request to generate a temporary destination.

A collator (255) associated with an apparatus (250) of the preferred embodiment retrieves the original identifier logged in storage by the logger (210).

At 325, the collator (255) includes the original identifier in the request.

Note that the original identifier was generated by the messaging server (225) when the original temporary destination (220) was generated—however, the original identifier is logged and used in order to provide it as an input in the request.

At 330, the client messaging software (215) sends the request to the messaging server (225).

In response to receiving the request, at 335, the messaging server (225) determines whether the original temporary destination (220) has been destroyed.

In response to the messaging server (225) determining that the original temporary destination (220) has not been destroyed (e.g. because the reconnection was due to a network error and not because the messaging server's availability was interrupted), at 345, the original temporary destination (220) continues to be used and the messaging server (225) associates the re-connected client program (205) as the owner of the original temporary destination (220).

In response to the messaging server (225) determining that the original temporary destination (220) has been destroyed, the messaging server (225) generates (340) a new temporary destination.

The messaging server (225) associates the original identifier that was added to the request by the collator (255) with the new temporary destination.

The messaging server (225) also associates the re-connected client program (205) as the owner of the new temporary destination.

Because the original identifier has been preserved and used, the client program (205) need not know that the original temporary destination (220) has been replaced.

As the original identifier that the client program (205) first obtained when the original temporary destination was created remains valid, the client program (205) will continue to receive reply messages. It is possible to take existing client programs that use a request-reply messaging pattern and deploy them into a highly available environment without modification. Temporary destinations can still be used by client programs in such an environment.

It will be clear to one of ordinary skill in the art that all or part of the embodiments of the may suitably and usefully be embodied in a logic apparatus, or a plurality of logic apparatus, comprising logic elements arranged to perform the described operations and that such logic elements may comprise hardware components, firmware components or a combination thereof.

It will be equally clear to one of skill in the art that all or part of a logic arrangement according to embodiments may suitably be embodied in a logic apparatus comprising logic elements to perform the operations, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored.

It will be appreciated that the described embodiments may also suitably be carried out fully or partially in software running on one or more processors (not shown in the Figures), and that the software may be provided in the form of one or more computer program elements carried on any computer usable medium (also not shown in the Figures) such as a magnetic or optical disk or the like. Channels for the transmission of data may likewise comprise storage media of all descriptions.

The embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Embodiments may be realized in the form of a computer implemented method of deploying a service that deploys computer program code operable to, when deployed into a computer infrastructure and executed thereon, to cause said computer system to perform all the operations of the described method.

It will be clear to one skilled in the art that many improvements and modifications can be made to the foregoing exemplary embodiment without departing from the scope of the present invention.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
receiving an identifier for a temporary destination in response to a messaging software at
   a client issuing a first request that a messaging server create the temporary destination, wherein the messaging software uses the identifier to indicate the temporary destination as a destination for responses to messages from the messaging software;
logging the identifier;
detecting disconnection from the messaging server;
creating a second request that the messaging server create a temporary destination in
   response to said detecting disconnection from the messaging server;
indicating the identifier in the second request; and
transmitting the second request indicating the identifier to the messaging server to
   preserve a messaging service in a highly available environment;
the messaging server determining that the temporary destination has not been destroyed; and
reassociating the client with the temporary destination.

2. The method of claim 1, further comprising:
the messaging server determining that the temporary destination has been destroyed;
creating a new temporary destination in response to the second request;
associating the new temporary destination with the identifier; and
associating the client as owner of the new temporary destination.

3. The method of claim 2, wherein the disconnection occurs due to a failure of a prior messaging server.

4. The method of claim 1, wherein the disconnection occurs due to a network error.

5. The method of claim 1, wherein said detecting disconnection from the messaging server comprises receiving a notification of the disconnection from the messaging server.

6. The method of claim 1, wherein said indicating the identifier in the second request comprises a collator writes the identifier into the second request.

7. A computer program product for preserving a messaging service in a highly available environment, the computer program product comprising:
a computer readable storage device having computer readable program code embodied therewith, the computer readable program code configured to:
determine that a messaging software at a client was disconnected from a messaging server that supports the messaging service;
receive a request from the messaging software for a temporary destination, wherein the request indicates a temporary location identifier;
determine if a temporary location identified by the temporary location identifier has been destroyed;
if the temporary location has been destroyed,
create a new temporary location;
assign the temporary location identifier to the new temporary location;
associate the client as owner of the new temporary location;
if the temporary location has not been destroyed,
re-associate the client as owner of the temporary location.

8. The computer program product of claim 7, wherein the computer readable program code is further configured to:
receive an initial request for a temporary location from the messaging software prior to the client being disconnected;
create the temporary location in response to the initial request;
generate the identifier;
assign the identifier to the temporary location;
associate the client as owner of the temporary location; and
communicate the identifier to the messaging software.

9. The computer program product of claim 8, wherein the client was disconnected due to a network error.

10. The computer program product of claim 7, wherein the client was disconnected due to a failure of another messaging server.

11. A computer program product for preserving a messaging service in a highly available environment, the computer program product comprising:
a computer readable storage device having computer readable program code embodied therewith, the computer readable program code configured to:
receive an identifier for a temporary destination in response to a messaging software at a client issuing a first request that a messaging server create the temporary destination, wherein the messaging software uses the identifier to indicate the temporary destination as a destination for responses to messages from the messaging software;
log the identifier;
detect disconnection from the messaging server;
create a second request that the messaging server create a temporary destination in response to a detection of said disconnection from the messaging server;
indicate the identifier in the second request; and
transmit the second request indicating the identifier to the messaging server;
determine that the temporary destination has not been destroyed; and
reassociate the client with the temporary destination.

12. The computer program product of claim 11, wherein the computer readable program code configured to detect disconnection from the messaging server comprises the computer readable program code being configured to receive a notification of the disconnection from the messaging server.

13. The computer program product of claim 11, wherein the disconnection occurs due to one of a network error and a failure of a prior messaging server.

14. An apparatus comprising:
a processor;
a network interface;
a messaging server operable to,
determine that a messaging software at a client was disconnected from the messaging server that supports a messaging service;
receive a request from the messaging software for a temporary destination, wherein the request indicates a temporary location identifier;
determine if a temporary location identified by the temporary location identifier has been destroyed;
if the temporary location has been destroyed,
create a new temporary location;
assign the temporary location identifier to the new temporary location;
associate the client as owner of the new temporary location;
if the temporary location has not been destroyed,
re-associate the client as owner of the temporary location.

15. The apparatus of claim 14, wherein the messaging server is further operable to:
receive an initial request for a temporary location from the messaging software prior to the client being disconnected;
create the temporary location in response to the initial request;
generate the identifier;
assign the identifier to the temporary location;
associate the client as owner of the temporary location; and
communicate the identifier to the messaging software.

16. The apparatus of claim 14 further comprising a computer readable medium that embodies the messaging server.

* * * * *